United States Patent [19]
Takada et al.

[11] Patent Number: 4,958,534
[45] Date of Patent: Sep. 25, 1990

[54] SHIFT DEVICE FOR HYDRAULIC TRANSMISSION

[75] Inventors: Kazuyoshi Takada; Tadashi Takayama; Takanori Suzuki; Haruhiko Nakanosono, all of Iwata, Japan

[73] Assignee: Yamaha Hatsudoki Kabushiki Kaisha, Iwata, Japan

[21] Appl. No.: 382,090

[22] Filed: Jul. 19, 1989

[30] Foreign Application Priority Data

Jul. 21, 1988 [JP] Japan ................. 63-180405

[51] Int. Cl.$^5$ .......................... G05G 5/06; G05G 7/00
[52] U.S. Cl. ........................................ 74/475; 74/527
[58] Field of Search .................... 74/474, 475, 527

[56] References Cited

U.S. PATENT DOCUMENTS

| | | | |
|---|---|---|---|
| 3,054,302 | 9/1962 | Cone | 74/475 |
| 3,500,697 | 3/1970 | Schowalter | 74/475 X |
| 4,341,129 | 7/1982 | Bando | 74/474 X |
| 4,608,879 | 9/1986 | Ishida et al. | 74/474 |

Primary Examiner—Allan D. Herrmann
Attorney, Agent, or Firm—Ernest A. Beutler

[57] ABSTRACT

A hydrostatic transmission utilized in a tractor that drives a mower attachment. The hydrostatic transmission includes a control shaft that is operated through a linkage system from a shift control lever. An adjustable detent operates directly on the control shaft for locking the control shaft in its neutral condition. The linkage system includes a lost motion connection so that the detent can operate without having to move the linkage system or the shift control lever.

12 Claims, 6 Drawing Sheets

SHIFT DEVICE FOR HYDRAULIC TRANSMISSION

BACKGROUND OF THE INVENTION

This invention relates to a shift device for a hydraulic transmission and more particularly to an improved shifting arrangement for hydraulic transmissions that will insure that the transmission is locked in a neutral condition when the shift lever is placed in its neutral condition.

Hydrostatic transmissions are used for a wide variety of purposes and applications. Such transmissions include a fluid pump that is driven by an internal combustion engine and which supplies fluid under pressure to a fluid motor that drives a driven object. The speed at which the output object is driven depends upon the delivery of the fluid pump which is varied conventionally by some form of swash plate mechanism. Such transmissions frequently operate not only between a neutral and a forward drive condition but also between a neutral and a rearward drive condition. Most frequently, the swash plate is controlled by a control shaft that is mounted in the transmission housing and which is itself is rotated from a remotely positioned shift lever through an intermediate shift linkage assembly. Because of the incorporation of such linkage assemblies, it is sometimes difficult to insure that the transmission control shaft is placed in its neutral condition at the same time the shift lever is in its neutral condition. As the complexity of the linkage system increases, the difficulties to insure this coincidence of neutral conditions becomes more and more difficult.

It has, therefore, been proposed to employ a detent mechanism for locking the transmission control shaft in its neutral condition. However, the detent mechanisms previously proposed for this purpose are not completely satisfactory in that they do not necessarily insure that the transmission is in fact in its neutral condition when the shift lever is in its neutral condition.

It is, therefore, a principal object of this invention to provide an improved detent locking mechanism for a hydrostatic transmission that will insure that the transmission is in its neutral condition when the shift lever is in its neutral condition.

It is a further object of this invention to provide an improved and adjustable detent mechanism for a hydrostatic transmission that acts directly on the transmission control shaft so as to insure that the control shaft will be retained in its neutral condition.

In addition to the difficulties as aforedescribed, there is a further problem in connection with the prior art type of neutral detent mechanisms. These mechanisms, as has teen noted, are intended to bias the transmission control shaft to its neutral condition. However, because of the fact that the transmission control shaft is connected to the shift control lever, the detent mechanism must move the entire interconnecting linkage system and the shift lever when the control shaft is biased to its neutral condition. This requires greater than acceptable spring rates and also means that the operator must release the shift lever in order for the detent mechanism to operative.

It is, therefore, a still further object of this invention to provide an improved linkage assembly for a transmission control shaft embodying a neutral detent lock wherein the detent lock can lock the transmission without having to move the entire linkage assembly and shift control lever.

SUMMARY OF THE INVENTION

This invention is adapted to be embodied in a control mechanism for a hydrostatic transmission having a control shaft rotatable between a neutral position and a drive position. A shift control member is movable between a neutral position and a drive position and linkage means operatively connect the shift control member to the control shaft for rotating the control shaft between its positions in response to movement of the shift control member between its positions. Detent means releasably restrain the control shaft in its neutral condition.

In accordance with a first feature of the invention, the detent means are adjustable adjusting the neutral position of the control shaft.

In accordance with another feature of the invention, the linkage means includes a lost motion connection so that the detent means can lock the control shaft in its neutral condition without having to effect movement of the shift control member.

BRIEF DESCRIPTION OF THE DRAWINGS

FIG. 5 is a cross-sectional view of the hydrostatic transmission taken along a generally vertically extending plane parallel to the plane of FIG. 2 but looking in the opposite direction.

FIG. 6 is a cross-sectional view taken along the line 6—6 of FIG. 5.

DETAILED DESCRIPTION OF THE PREFERRED EMBODIMENT OF THE INVENTION

Figure 1:
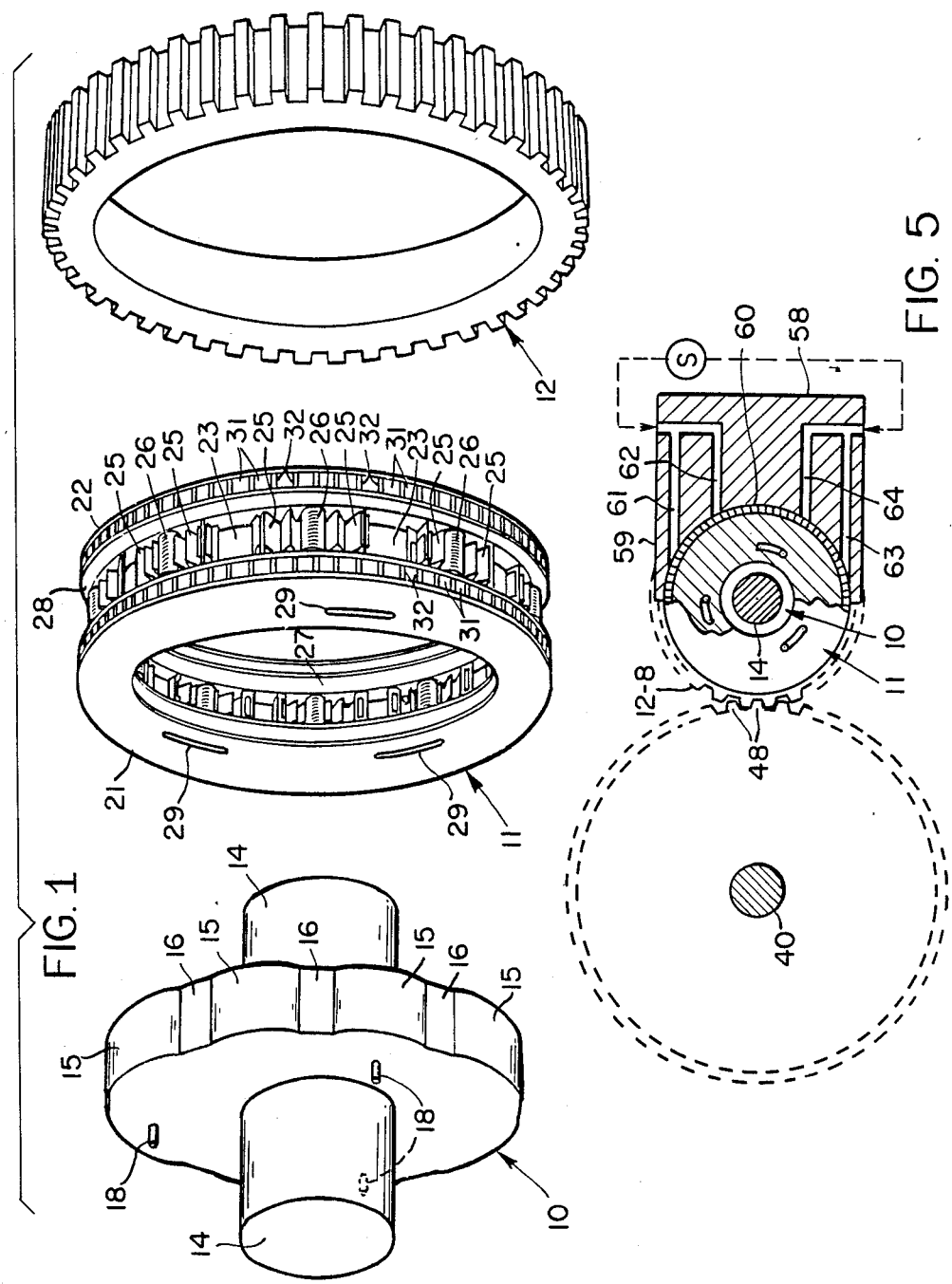
FIG. 1 is a side elevational view of a tractor with a lawn mower attachment constructed in accordance with an embodiment of the invention, with portions of the tractor shown in phantom.

Referring in detail to the preferred embodiment and initially to FIG. 1, a lawn or garden tractor such as a riding mower constructed in accordance with an embodiment of the invention is identified generally by the reference numeral 11. The tractor mower 11, which is a typical environment in which the invention may be practiced, is comprised of a frame 12 that mounts an internal combustion engine 13 of any known type. The engine 13 has an output shaft 14 that is coupled by a drive belt 15 to an input pulley 16 of a hydrostatic drive, indicated generally by the reference numeral 17. The hydrostatic drive 17, as will be later described, comprises a fluid pump of the swash plate type so as to vary the output of the pump and a fluid motor that is driven by the pump. This fluid motor is drivingly coupled by a final drive 18 to a rear axle for driving the rear wheels 19 of the tractor in a known manner.

A fan 20 is affixed for rotation with the pulley 16 for cooling the hydrostatic drive 17 and the final drive 18. The hydrostatic drive 17 may be of any known type such as is shown in the copending application entitled "Shifting Device For Lawn Mower And The Like", Ser. No. 325,305, filed Mar. 17, 1989, and assigned to the assignee hereof, and includes a swash plate control mechanism which is controlled by means of a shift lever 22 that is positioned in proximity to a rider's seat 23. The shift lever 22 is interconnected to the swash plate control mechanism by a control linkage, indicated generally by the reference numeral 24.

A pair of dirigible front wheels 25 are supported at the forward end of the frame 12 in a known manner and are steered by means of a steering wheel 26 that is positioned forwardly of the rider's seat 23.

The tractor 11 may serve any of a wide variety of purposes and is depicted as being of the lawn mower type and carries a lawn mower attachment, indicated generally by the reference numeral 27 that is supported beneath the frame 12 by a parallel linkage system 28 and 29. The height of the lawn mower attachment 27 may be adjusted by a control lever 31 and the lawn mower attachment when engaged with the ground rides along the ground on a pair of wheels 32.

The lawn mower attachment has a cutter blade 33 that is driven by a pulley mechanism 34. The pulley mechanism 34 is driven from the engine output shaft 14 by means of an electrically operated clutch 35 that couples the output shaft 14 to a driven pulley 36. A driving belt 37 transfers drive from the driven pulley 36 to the pulley assembly 34 which in turn drives a further belt 38 and pulley 40 that is connected to the cutter blade 33.

Figure 2:
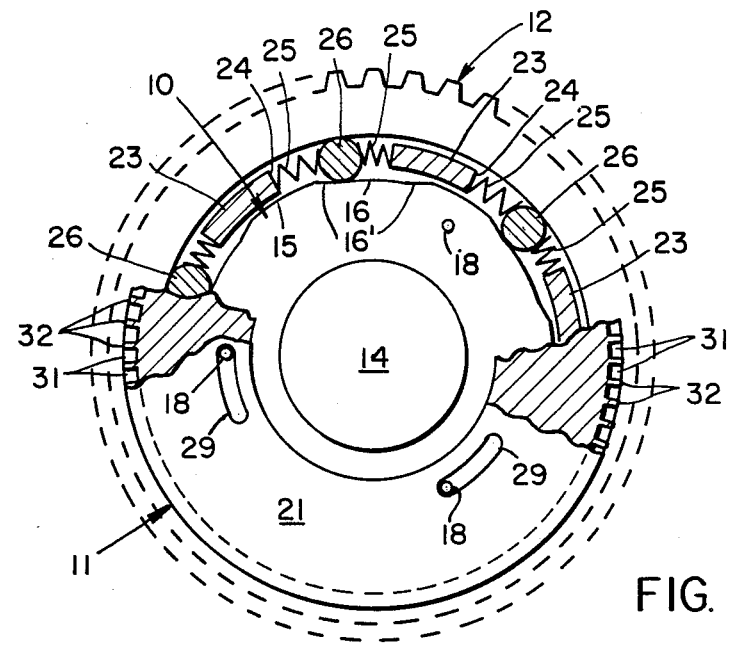
FIG. 2 an enlarged rear elevational view showing the transmission and control mechanism therefor, with a portion broken away.
Figure 4:
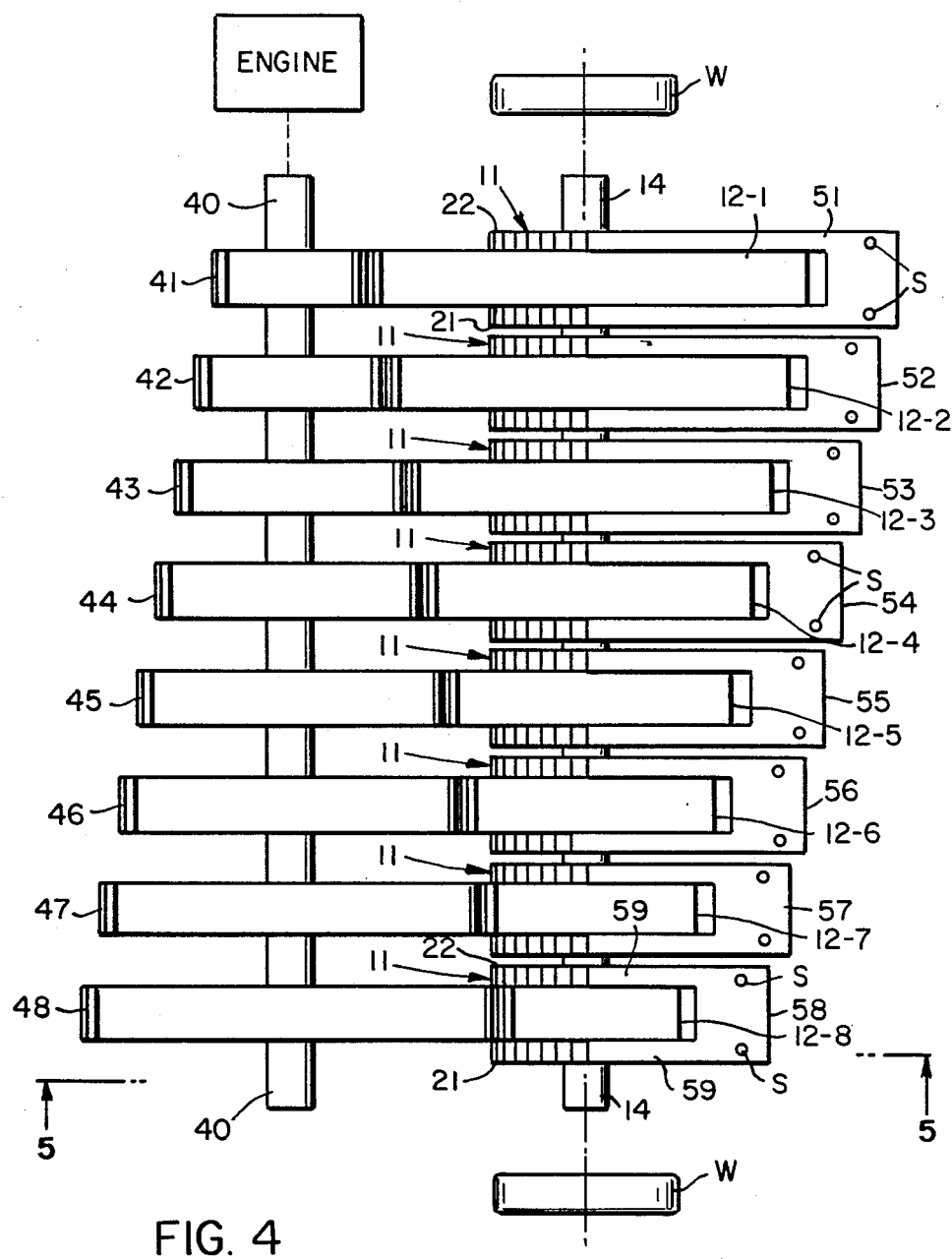
FIG. 4 is a top plan view of the transmission and control mechanism.

Referring now additionally to FIGS. 2 and 4, the shift lever 22 has a generally tubular base 39 that is journaled upon a pivot shaft 41. The pivot shaft 41 is, in turn, affixed to a pair of outstanding ears formed in a bracket assembly 42. The bracket assembly 42 is, in turn, affixed to an annular hub 43 which has a splined connection to a pivot shaft 44 that is journaled on a mounting bracket assembly 45. The bracket assembly 45 is, in turn, affixed to the frame 12.

It should be noted that the aforedescribed construction permits the shift lever 22 to be pivoted about a rotational axis defined by the shaft 44 as shown in FIGS. 2 and 4 from the neutral position to in a forward drive direction (F) and a reverse drive direction (R). The support hub 43 for the shift lever 22 may move to a limited extent axially along the shaft 44 and a coil compression spring 47 that is held under tension by a locking nut 48 normally resists this axial movement.

In addition to being axially movable along the shaft 44, the shift lever 22 may also pivot about the pivot shaft 41. A torsional spring 49 i interengaged between the shift lever 22 and the bracket 42 so as to yieldably resist pivotal movement about the pivot shaft 41.

The shaft 44 is affixed to a lever 51 that carries a spherical joint 52 to provide a universal connection to one end of a shift link 53. The opposite end of the shift link 53 has a similar spherical connection 54 to a shift bell crank 55. The bell crank 55 is rotatably journaled on a pivot shift 60 which is, in turn, carried on the hydrostatic drive 17.

The shift bell crank 55 has a further arm portion that carries an upstanding pin 56. The pin 56 is received within an elongated slot 57 of a lever 58 which is, in turn, affixed to the control shaft 59 of the hydrostatic drive 17. It should be noted that the control lever slot 57 is greater in width than the diameter of the pin 56 so as to provide some lost motion between the movement of the bell crank 55 and the control lever 58, for a reason which will become apparent.

Referring now specifically to FIGS. 5 and 6, the hydrostatic drive 17 is comprised of a main housing portion 61 that is closed by a cover plate 62. An input shaft 63, driven by the pulley 16, is journaled within this assemblage and has affixed to it a pump cylinder assembly 64 that rotates with the input shaft 63 and which forms a plurality of cylinder bores 65 that extend generally parallel to the axis of rotation of the shaft 63. Pistons 66 are slidably supported within the bores 65 and are urged by coil compression springs 67 into engagement with the swash plate assembly 68. The swash plate assembly 68 includes a control ring 69 that engages a spherical bearing 71 formed in the pump housing member 61 so that the swash plate 68 may be rotated from the forward drive position as shown in the solid line view of FIG. 5 to the full reverse direction as shown in the phantom line position of this figure upon operation of a swash plate control mechanism 72 that is affixed to and operated by the control shaft 59.

Depending upon the angular inclination of the swash plate 62, one of two conduits, to be described, formed in the end plate 62 is pressurized and the other of these conduits is depressurized so as to provide a return conduit. The flow takes place to and from ports 73 formed in the cylinder block 64 in registry with each of the respective cylinder bores 65. This pressure is delivered to corresponding ports 74 formed in a motor cylinder block 75 which is also journaled within the pump housing 61. The cylinder block 75 is affixed for rotation with an output shaft 76 that is journaled within the housing 61 and cover plate 62 and which provides an input shaft to the final drive 18 of the tractor 11.

The cylinder block 75 is formed with a plurality of cylinder bores 77 in which pistons 78 are slidably supported. The pistons 78 are held into engagement with an angularly disposed thrust bearing 79 by means of coil compression springs 81. Depending upon the degree of timing of pressurization of the ports 74, the cylinder block 75 and shaft 76 will be driven in either forward or reverse directions at a predetermined speed ratio relative to the input shaft 63.

Referring now to FIG. 6, the porting arrangement for the hydrostatic drive 17 is illustrated. This porting arrangement includes a parallel pair of flow passages 82 and 83 that extend through the cover plate 62 and which are closed at their opposite ends by plugs 84. At one end, the passages 82 and 83 are connected by arcuate ports 85 and 86 to an area that registers with the ports 73 of the cylinder block 64 so as to sequentially receive fluid from these ports and to return fluid to it, depending upon the direction of rotation. In the illustrated embodiment, the input shaft 63 is rotating in a clockwise direction (its normal direction of rotation) and the swash plate mechanism 68 is positioned for forward drive so that the port 85 and passage 82 are pressurized. The port 86 and passage 83 act as return paths.

At the other end of the passages 82 and 83 there are provided a second pair of ports 87 and 88 that communicate with the ports 74 of the cylinder block 75. When the passage 82 is pressurized, the port 87 will be an inlet port and the port 88 will be an outlet port and the output shaft 76 will be rotated in a counterclockwise or forward drive mode. In the event the swash plate 68 is rotated for reverse drive, the shaft 63 will continue to rotate in the clockwise direction but now the port 86 will be an outlet port and the passage 83 will be the supply port while the passage 82 will act as a return passage and the port 85 acts as a return port. Under this condition, the ports 74 of the cylinder block 75 are pressurized through the port 88 and the port 87 acts as a return port. The output shaft 76 will then be rotated in a clockwise direction which is the reverse drive mode.

In addition to the neutral condition which may be achieved by appropriately positioning the swash plate 68, there is also provided a neutral bypass valve, indicated generally by the reference numeral 89. This neutral bypass valve 89 may be operated to open a passage 91 so as to permit free communication between the passages 82 and 83. When this occurs the tractor 11 may be towed without resistance from the hydrostatic drive 17 and engine 13.

The neutral valve 89 controls the flow through the bypass passageway 91 that is drilled through one side of the cover plate 62 and across the passages 82 and 83 and which is closed by a closure plug 92.

In order to permit make up fluid to flow into the hydrostatic transmission, there is provided an external reservoir 93 that communicates with the main housing portion 61. A passageway 94 in the main housing 61 communicates the fluid from the reservoir 93 with a further passageway 95 formed in the end plate 62. The passageway 95 communicates with a radially extending passageway 96 which, in turn, communicates at its inner end with a cross passageway 97. The cross passageway 97 can communicate with the passage 82 through a ball type check valve 98 that is normally held in a closed position by a spring 99. In a like manner, the passageway 97 can communicate with the passageway 83 by means of a check valve 101 that is normally held in a closed position by means of a spring 102.

It should be noted that when fluid is depleted from the passage 83 when operating in the forward direction, the pressure difference on the check valve 101 will cause it to open and draw make up fluid from the main housing 61. In a like manner, when operating in the reverse mode if fluid make up is required, it will be drawn by opening the valve 98 so as to permit make up fluid to the drawn into the passageway 82 from the main housing 62.

A restricted passageway 103 through the check valve 101 provides some leakage in the path 83. This fluid leakage will return either to the main housing 61 or back to the passageway 82 depending upon the amount of fluid in the system. This leakage occurs when the shift lever 22 has been shifted to the reverse range and because of it, it will be necessary to move the lever 22 further in the reverse direction so that the pressure can be built up the point to generate sufficient power to the output shaft 76 to effect reverse operation. As a result, it should be apparent that the neutral range is significantly increased by means of this arrangement.

As has been previously noted, the interpositioning of the linkage system 24 between the shift lever 22 and control shaft 59 makes it desirable to insure that the control shaft 59 is truly locked in a neutral condition. Hydrostatic drives, as is well known, can provide significant changes in drive for small angular movements of their control shafts. This is a still further reason why such a neutral locking or retaining mechanism for the hydrostatic drive 17 is desired.

Figure 3:
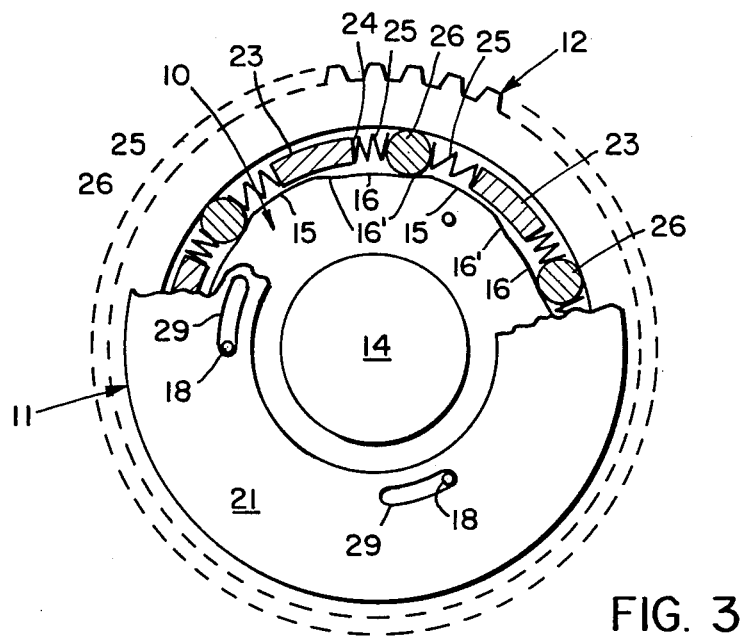
FIG. 3 is a side elevational view of the transmission and control mechanism taken generally in the direction of the arrow 3 in FIG. 2 and in the same general direction as FIG. 1.

Returning again to FIGS. 2 through 4, there is provided a detent locking mechanism, indicated generally by the reference numeral 104 that operates directly on the control shaft 59 for providing such neutral retention. It should be noted that the lever 58 is also formed like a bell crank and has a detent notch 105 formed in the arm opposite to the arm in which the slot 57 is formed. A detent ball 106 that is biased and supported within a carrier 107 is adapted to engage the notch 105 in the neutral condition and retain the control shaft 59 therein.

The detent ball 106 and its carrier 107 is supported on a lever 108 that is pivotally supported relative to the control shaft 59 by forming it with a journal portion that surrounds the control shaft 59. The angular position of the detent ball 106 and, accordingly, the neutral lock position, can be adjusted by pivoting the supporting lever 108 about the shaft 59. Since this pivotal movement is about the same shaft, extreme accuracy and a simple construction is provided. The lever 108 has an arcuate slot 109 through which a threaded fastener 111 passes. The threaded fastener 111 is threaded into the housing of the hydrostatic drive 17 and can be locked in position so as to adjust the neutral condition, as aforenoted. To permit a fine adjustment, there is provided a threaded fastener 112 that acts as an abutment against a stop plate 113 so as to insure a very accurate and fine adjustment.

It should be noted that the cooperation of the detent ball 106 with the detent notch 107 tends to cam the lever 58 and control shaft 59 in their neutral condition. As has been previously noted, the slot 57 has a larger diameter than the pin 56 carried by the bell crank 55. As a result, this provides a lost motion connection and the detent mechanism 104 may operate so as to achieve this neutral locking without having to operate the remainder of the control linkage system 24 or the shift lever 22. As a result, the neutral locking can be achieved even if the operator maintains some pressure on the shift lever 22.

There are provided a pair of adjustable stops 114 and 115 that are adapted to be engaged by the arms of the control lever 58 so as to limit the movement in the forward and reverse directions.

Referring again to FIG. 1, the tractor 11 is further provided with a brake assembly that is operated by means of a brake control pedal 118 that is disposed forwardly of the rider's seat 23 and which is pivotally supported on the frame 12 by means of a brake shaft 119. Depression of the brake pedal effects pivotal movement of a brake controlling lever 121 that is fixed for rotation with the shaft 119 and which operates a brake mechanism contained internally within the final drive 18 by means of a control link 122.

As is described in detail in the copending application entitled "Shifting Device For Lawn Mower And The Like", Ser. No. 346,476, filed May 2, 1989 and assigned to the assignee of this application, it is also desirable to insure that the hydrostatic transmission 17 is returned to neutral condition when the brake is applied by depressing the brake pedal 118. An interrelating mechanism, as described in detail in that application, is incorporated for this purpose. The disclosure of that application is incorporated herein by reference, but that mechanism may be best understood by reference to FIGS. 1, 3 and 4 and includes a brake operated transmission release pin 123 affixed to the transmission control lever 51 and is adapted to be engaged by a transmission release mechanism, indicated generally by the reference numeral 124, upon actuation of the brake pedal 118 so as to move the shift lever 22 and transmission control shaft 59 to their neutral positions when the brake pedal 118 is depressed.

The transmission release mechanism 124 basically is designed so as to engage the pin 123 and rotate the lever 51 and shaft 59 to its neutral position when the brake pedal 118 is applied and regardless of whether the hydrostatic drive 17 is in either the forward drive or reverse drive modes. The mechanism 124 includes a link 125 that is pivotally connected at one end to the brake operating lever 121 at a point spaced between the pivot shaft 119 and the pivotal connection of the brake operating link 122 to this lever.

The link 125 has an adjustable connection to an overload release mechanism, indicated generally by the reference numeral 126. The overload release mechanism 126 has sufficient rigidity so as to transmit movement of the link 125 into movement of a rod 127. However, once the transmission release pin 123 has been moved to its neutral position, the overload release mechanism 126 will yield so as to permit retention in this position, as will become apparent.

The rod 119 is connected by means of an operating system to a scissors-like mechanism, comprised of a first bell crank having a locking jaw 128 and a second bell crank having a locking jaw 129. The bell cranks having the locking jaws 128 and 129 are pivotally supported on the shaft 44.

The bell crank carrying the locking jaw 128 is operated by means of a link 131 that is connected to the other arm of the bell crank. In a like manner, the jaw 129 is operated by a link 132 that has a pivotal connection to the other arm of the bell crank forming the jaw 129. The links 131 and 132 are both pivotally connected to the end of the rod 127 by a single pivot pin 133.

When the brake pedal 118 is depressed to operate the brake mechanism in the manner previously described, the lever 121 is rotated in the counterclockwise direction exerting a pull on the link 125. When this occurs, the overload release mechanism 126 moves to the left and during this initial movement causes the rod 127 also to move to the left. This effects a pull on the levers 131 and 132 so as to act on the locking jaws 128 and 129 much in a manner like a scissors to pivot them toward a closed position. Therefore, one of the jaws 128 and 129 will contact the pin 123 and rotate the lever 51 in a direction to move the transmission control shaft 59 and shift lever 22 to its neutral position.

As the brake pedal 118 is continued to be depressed, the jaws 128 and 129 will move together so as to rigidly retain the pin 123 in its neutral condition. If the pedal 118 is further depressed, the overload release mechanism 126 will yield and allow over-movement without further pivotal movement of the locking jaws 128 and 129. However, the pin 123 will be rigidly held in its neutral condition.

Once the brake pedal 118 has been released, the operator can again shift the transmission into any desired drive mode without encumbrance by the neutral releasing mechanism.

It should be readily apparent from the foregoing description that a very effective mechanism is provided for insuring that the transmission control shaft of a hydrostatic transmission will be easily retained in its neutral condition and that this can be accomplished through a very simple and yet highly effective mechanism. In addition, this neutral position may be achieved by the detent locking mechanism without having to move any of the other shift linkage or the shift control lever. Although an embodiment of the invention has been illustrated and described, various changes and modifications may be made without departing from the spirit and scope of the invention as defined by the appended claims.

We claim:

1. A control mechanism for a hydrostatic transmission having a control shaft rotatable between a neutral position and a drive position, a shift control member movable between a neutral position and a drive position, linkage means operatively connecting said shift control member to said control shaft for rotating said control shaft between its neutral and drive positions in response to movement of said control member between its neutral and drive positions, detent means for releasably retaining said control shaft in its neutral position and means for adjusting the position for at least a portion of said detent means for adjusting the neutral position of said control shaft.

2. A control mechanism for a hydrostatic transmission as set forth in claim 1 wherein the detent means acts directly on the control shaft.

3. A control mechanism for a hydrostatic transmission as set forth in claim 2 wherein the detent means includes a lever affixed to the control shaft.

4. A control mechanism for a hydrostatic transmission as set forth in claim 3 wherein the detent means comprises a detent recess formed in the lever.

5. A control mechanism for a hydrostatic transmission as set forth in claim 4 further including detent ball means cooperating with said detent recess for yieldably retaining said control shaft in its neutral position.

6. A control mechanism for a hydrostatic transmission as set forth in claim 5 wherein the detent ball is the adjustable member of the detent means.

7. A control mechanism for a hydrostatic transmission as set forth in claim 6 wherein the detent ball is adjustable about an axis that is coincident with the axis of rotation of the control shaft.

8. A control mechanism for a hydrostatic transmission as set forth in claim 7 wherein the linkage means includes a lost motion connection between the linkage means and the lever for retention of the lever in the neutral condition without necessitating movement of the linkage means or the control member.

9. A control mechanism for a hydrostatic transmission as set forth in claim 1 wherein the detent means is adjustable about an arc coincident with the axis of rotation of the control shaft.

10. A control mechanism for a hydrostatic transmission as set forth in claim 9 wherein the adjustable portion of the detent means comprises a spring biased ball.

11. A control mechanism for a hydrostatic transmission having a control shaft rotatable between a neutral position and a drive position, a shift control member movable between a neutral position and a drive position, linkage means operatively connecting said shift control member to said control shaft for rotating said control shaft between its neutral and drive positions in response to movement of said control member between its neutral and drive positions, and detent means for releasably retaining said control shaft in its neutral position, said linkage means including a lost motion connection for permitting the detent means to move the control shaft to its neutral position without necessitating movement of the linkage means.

12. A control mechanism for a hydrostatic transmission as set forth in claim 11 wherein the detent means includes a lever affixed to the control shaft and the lost motion connection is between the linkage means and the lever.

* * * * *

UNITED STATES PATENT AND TRADEMARK OFFICE
CERTIFICATE OF CORRECTION

PATENT NO. : 4,958,534

DATED : September 25, 1990

INVENTOR(S) : Kazuyoshi Takada, et al.

It is certified that error appears in the above-identified patent and that said Letters Patent is hereby corrected as shown below:

The title page should be deleted, to appear as per attached title page.

The sheets of drawings consisting of Figs. 1-5 should be deleted to be replaced with the attached pages.

Signed and Sealed this

First Day of June, 1993

*Attest:*

MICHAEL K. KIRK

*Attesting Officer*      *Acting Commissioner of Patents and Trademarks*

UNITED STATES PATENT AND TRADEMARK OFFICE
CERTIFICATE OF CORRECTION

PATENT NO. : 4,958,534

DATED : September 25, 1990

INVENTOR(S) : Kazuyoshi Takada et al

It is certified that error appears in the above-identified patent and that said Letters Patent is hereby corrected as shown below:

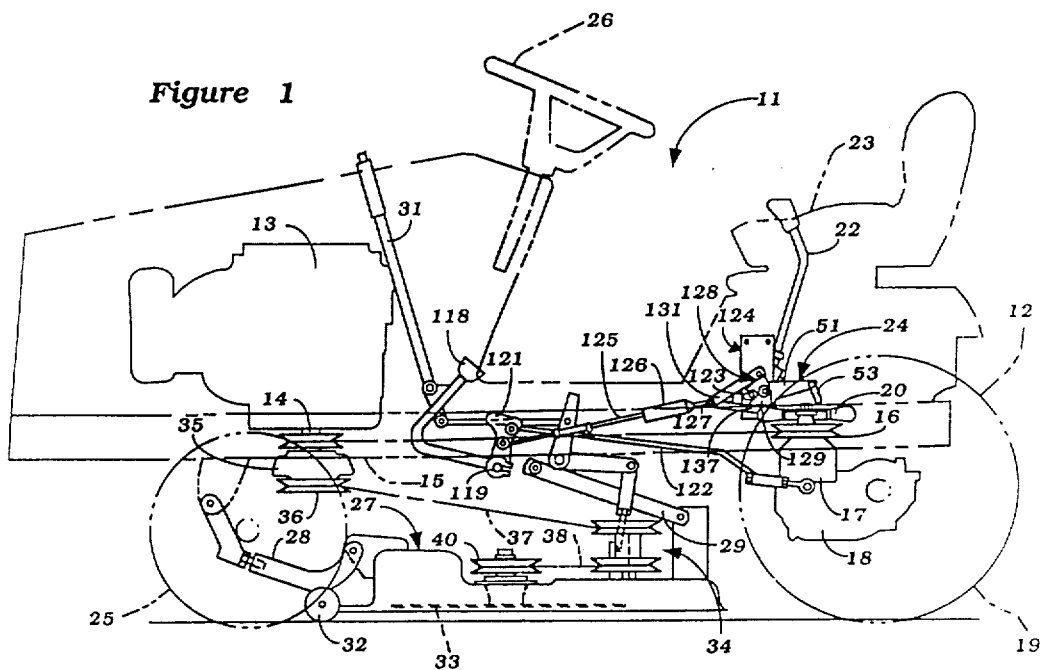

Figure 1

United States Patent [19]
Takada et al.

[11] Patent Number: 4,958,534
[45] Date of Patent: Sep. 25, 1990

[54] SHIFT DEVICE FOR HYDRAULIC TRANSMISSION

[75] Inventors: Kazuyoshi Takada; Tadashi Takayama; Takanori Suzuki; Haruhiko Nakanosono, all of Iwata, Japan

[73] Assignee: Yamaha Hatsudoki Kabushiki Kaisha, Iwata, Japan

[21] Appl. No.: 382,090

[22] Filed: Jul. 19, 1989

[30] Foreign Application Priority Data

Jul. 21, 1988 [JP] Japan ................ 63-180405

[51] Int. Cl.⁵ .......................... G05G 5/06; G05G 7/00
[52] U.S. Cl. ........................................ 74/475; 74/527
[58] Field of Search ........................ 74/474, 475, 527

[56] References Cited
U.S. PATENT DOCUMENTS

| | | | |
|---|---|---|---|
| 3,054,302 | 9/1962 | Cone | 74/475 |
| 3,500,697 | 3/1970 | Schowalter | 74/475 X |
| 4,341,129 | 7/1982 | Bando | 74/474 X |
| 4,608,879 | 9/1986 | Ishida et al. | 74/474 |

Primary Examiner—Allan D. Herrmann
Attorney, Agent, or Firm—Ernest A. Beutler

[57] ABSTRACT

A hydrostatic transmission utilized in a tractor that drives a mower attachment. The hydrostatic transmission includes a control shaft that is operated through a linkage system from a shift control lever. An adjustable detent operates directly on the control shaft for locking the control shaft in its neutral condition. The linkage system includes a lost motion connection so that the detent can operate without having to move the linkage system or the shift control lever.

12 Claims, 6 Drawing Sheets

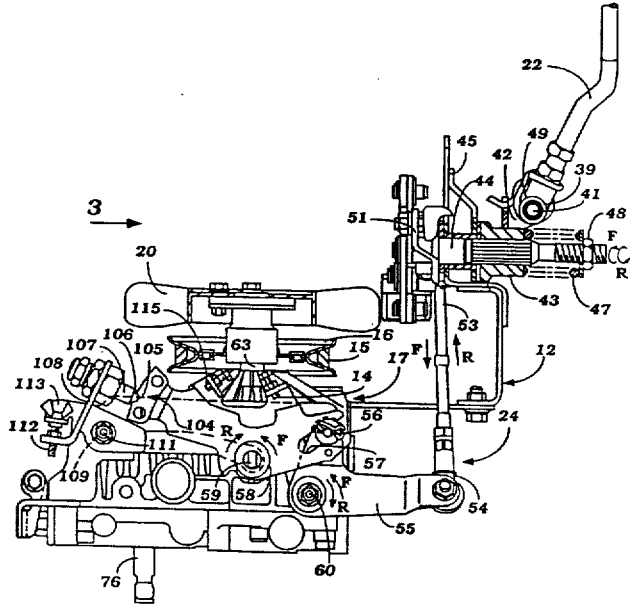

UNITED STATES PATENT AND TRADEMARK OFFICE
CERTIFICATE OF CORRECTION

Page 4 of 8

PATENT NO. : 4,958,534
DATED : September 25, 1990
INVENTOR(S) : Kazuyoshi Takada et al It is certified that error appears in the above-identified patent and that said Letters Patent is hereby corrected as shown below:

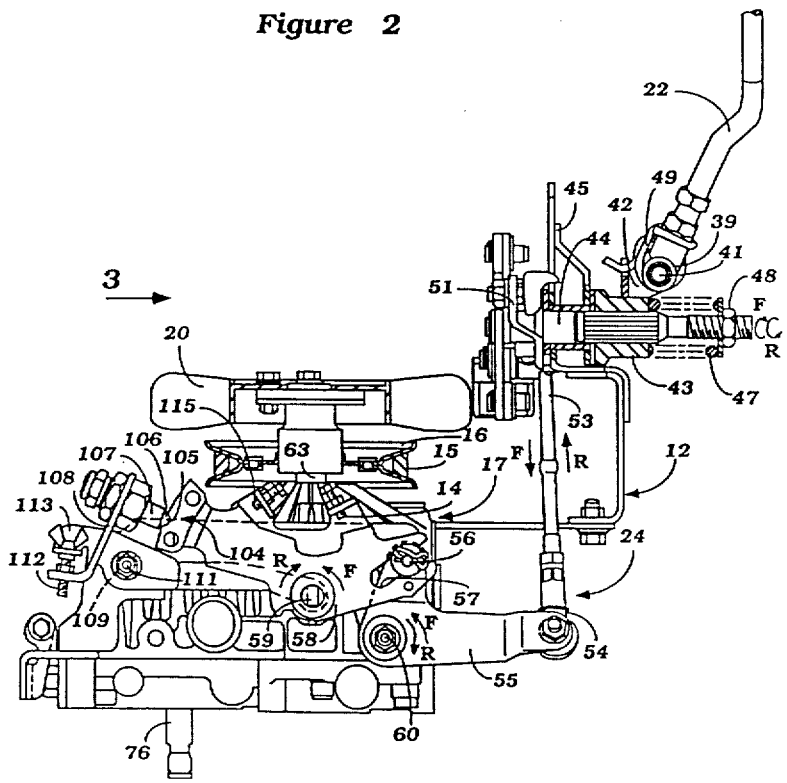

Figure 2

UNITED STATES PATENT AND TRADEMARK OFFICE
CERTIFICATE OF CORRECTION

PATENT NO. : 4,958,534

DATED : September 25, 1990

INVENTOR(S) : Kazuyoshi Takada et al

It is certified that error appears in the above-identified patent and that said Letters Patent is hereby corrected as shown below:

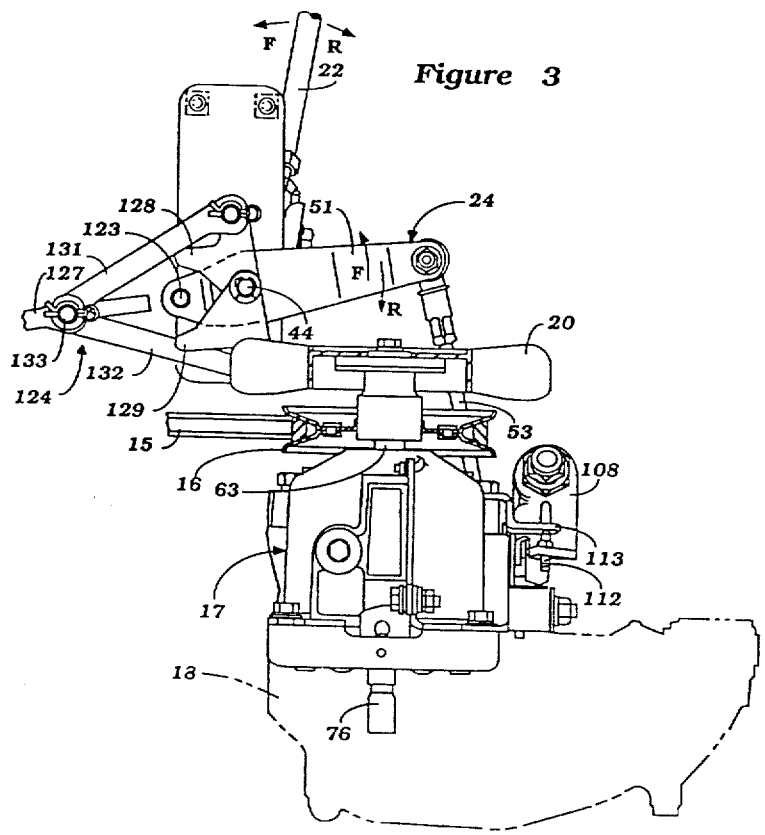

UNITED STATES PATENT AND TRADEMARK OFFICE
CERTIFICATE OF CORRECTION

PATENT NO. : 4,958,534

DATED : September 25, 1990

INVENTOR(S) : Kazuyoshi Takada et al

It is certified that error appears in the above-identified patent and that said Letters Patent is hereby corrected as shown below:

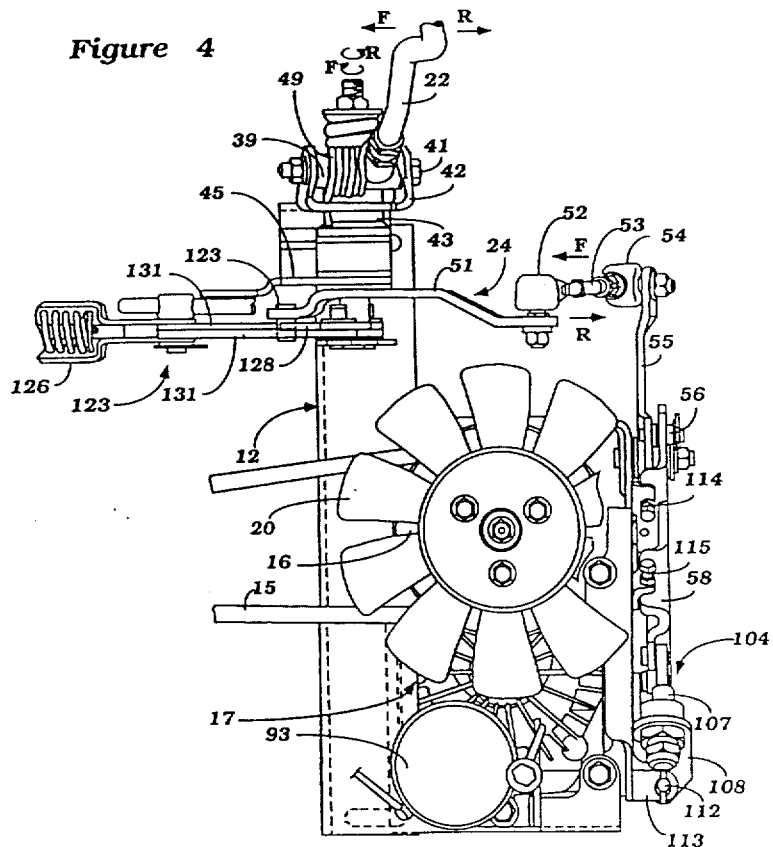

Figure 4

UNITED STATES PATENT AND TRADEMARK OFFICE
CERTIFICATE OF CORRECTION

PATENT NO. : 4,958,534

DATED : September 25, 1990

INVENTOR(S) : Kazuyoshi Takada et al

It is certified that error appears in the above-identified patent and that said Letters Patent is hereby corrected as shown below:

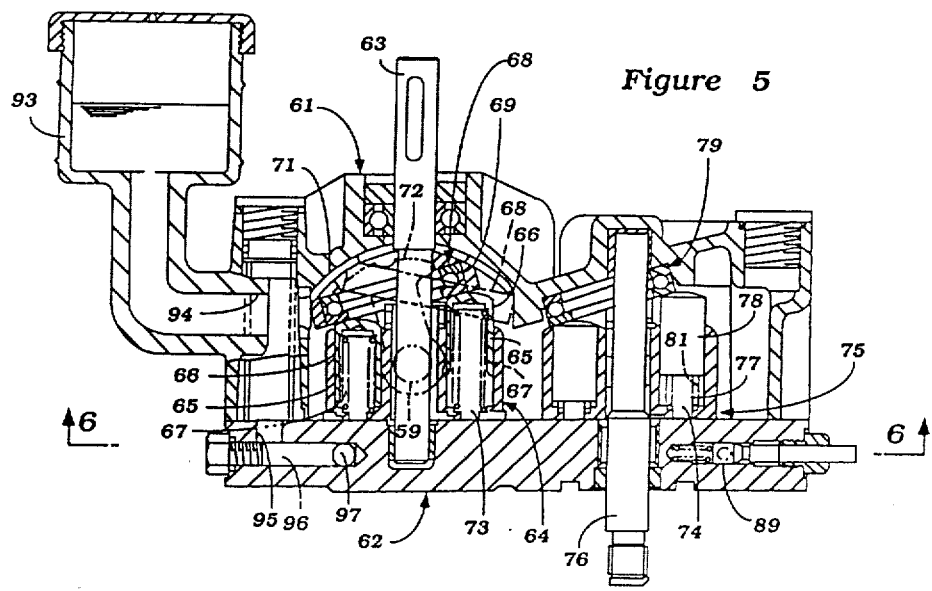

Figure 5

UNITED STATES PATENT AND TRADEMARK OFFICE
CERTIFICATE OF CORRECTION

PATENT NO. : 4,958,534

DATED : September 25, 1990

INVENTOR(S) : Kazuyoshi Takada et al.

It is certified that error appears in the above-identified patent and that said Letters Patent is hereby corrected as shown below:

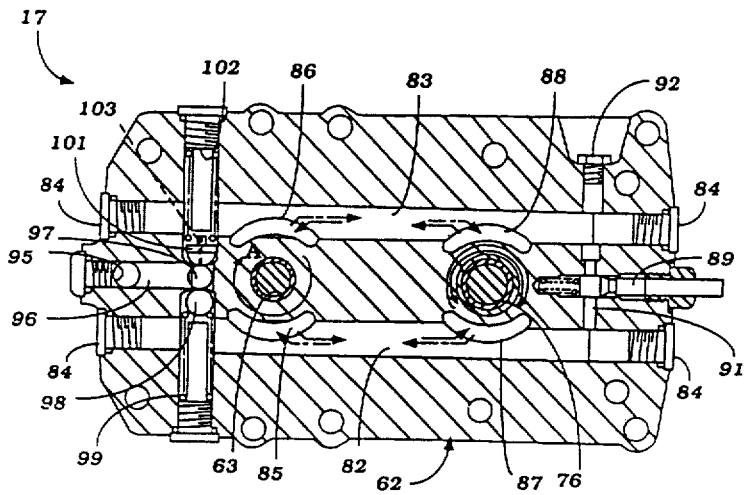

Figure 6